(12) United States Patent
Puneet et al.

(10) Patent No.: US 8,320,665 B2
(45) Date of Patent: Nov. 27, 2012

(54) DOCUMENT IMAGE SEGMENTATION SYSTEM

(75) Inventors: Jeff Puneet, Delhi (IN); Ghosh Hiranmay, Delhi (IN); Khare Ashish, Delhi (IN)

(73) Assignee: Tata Consultancy Services Ltd., Mumbai (IN)

( * ) Notice: Subject to any disclaimer, the term of this patent is extended or adjusted under 35 U.S.C. 154(b) by 270 days.

(21) Appl. No.: 12/752,444

(22) Filed: Apr. 1, 2010

(65) Prior Publication Data

US 2010/0290701 A1    Nov. 18, 2010

(30) Foreign Application Priority Data

May 13, 2009    (IN) .......................... 1239/MUM/2009

(51) Int. Cl.
*G06K 9/34*    (2006.01)
(52) U.S. Cl. ....................... 382/164; 382/173
(58) Field of Classification Search ................. 382/176, 382/164, 239, 245, 115, 199, 173, 224, 203; 340/5.52, 5.82; 358/403, 404; 375/240.2; 707/999.006

See application file for complete search history.

(56) References Cited

U.S. PATENT DOCUMENTS

| | | | |
|---|---|---|---|
| 5,933,524 A | 8/1999 | Schuster et al. | |
| 6,173,077 B1 | 1/2001 | Trew et al. | |
| 6,411,735 B1 * | 6/2002 | Williams et al. | 382/224 |
| 6,473,522 B1 | 10/2002 | Lienhart et al. | |
| 6,993,185 B2 * | 1/2006 | Guo et al. | 382/176 |
| 7,424,151 B2 * | 9/2008 | Lin et al. | 382/173 |

* cited by examiner

*Primary Examiner* — Anh Hong Do
(74) *Attorney, Agent, or Firm* — Robert Plotkin, P.C.

(57) ABSTRACT

A system and a method for document image segmentation have been disclosed. Image segments are obtained by forming different clusters in a document image. The document image may include images of company logos, product marks or trademarks. The invention can perform image segmentation on any kind of complex colored image and can recognize logos, product-marks or trademarks which comprise text or graphics, wherein the text can be either of uniform font style or uneven font style such as fancy font styles, calligraphic styles or having different orientation.

10 Claims, 4 Drawing Sheets

DOCUMENT IMAGE SEGMENTATION SYSTEM

CROSS-REFERENCE TO RELATED APPLICATION

The present application claims priority under 35 USC 119 of Indian Patent Application 1239/MUM/2009 filed May 13, 2009, the entire disclosure of which is incorporated herein by reference.

FIELD OF THE INVENTION

The present invention relates to the field of computer vision techniques. Particularly, the present invention relates to the segmentation of document images.

DEFINITIONS

In this specification, the following terms have the following definitions as given alongside. These are additions to the usual definitions expressed in the art.

Colour quantization—Colour quantization is the process of reducing number of colour values in an image while retaining the overall appearance of the image.

Gray Scale Image—A grayscale image is an image in which the colours are shown by different shades of gray.

Horizontal Energy—Horizontal energy is the sum of squares in the co-occurrence vector in horizontal direction.

Vertical Energy—Vertical Energy is the sum of squares in the co-occurrence vector in vertical direction.

Binarization—Binarization is the process of converting a gray scale image into an image having only two colours i.e. black and white (binarized image), by thresholding foreground and background pixels.

Hue, Saturation and Value (HSV) colour space—HSV colour space describes colours as points in a cylinder, whose central axis ranges from black at the bottom to white at the top with neutral colours between them. The angle around the axis corresponds to "hue" component of colours, the distance from the axis corresponds to "saturation" component of colours, and the distance along the axis corresponds to "lightness", "value", or "brightness" component of colours.

Hue, Saturation and Value colour space transformation—Hue, Saturation and Value colour space transformation is the transformation of an image into three images each of which contains only one component colours i.e. either hue component or saturation component, or value component.

Aspect Ratio—The aspect ratio of an image is the ratio of the width of the image to its height.

Thickened and Connected Image—A Thickened and connected image is an image having additional pixels at the boundaries of foreground pixels thereby connecting the adjacent foreground pixels to each other.

BACKGROUND OF THE INVENTION

A document image is usually made up of several segments like segments in text form and segments in pictorial form (images). Previous research mainly focused on extraction of text segments from the document images using Optical character recognition OCR by thresholding the grayscale image as text is often assumed to be printed in black on a white background.

OCR is a field of research in pattern recognition, artificial intelligence and machine vision. Though academic research in this field continues, the focus on OCR has shifted to the implementation of proven techniques.

The problem which existing systems are facing is concerned with partitioning an image into multiple regions (image segments) according to some homogeneity criterion, where the main problem arises in discrimination of the text areas from the figures (half-tones), both of them being relatively easy to extract from a white background.

U.S. Pat. No. 6,473,522 B1 discloses a method for segmentation of text in images where the image may be still or in motion such as video or web pages. The method comprises receiving a digital image including text and background, the received image is quantized to reduce the number of colours and define the image in terms of certain colours only, and a text colour histogram is obtained from several portions of the text and the background. This document doesn't provide any method for segmentation of images.

U.S. Pat. No. 5,933,524 titled 'Method for segmentation of digital colour images' published on Mar. 8, 1999 discloses a method where the coloured objects are represented by digitized colour histograms which are used for the segmentation of digital colour images. The binary values of the colour histograms decide whether the pixel can belong to a given object segment.

Similarly, the U.S. Pat. No. 6,173,077 titled 'Image Segmentation' published on Sep. 1, 2001 discloses a segmentation apparatus for assigning image pixels to regions, in accordance with a predetermined criterion.

For the segmentation methods implemented in the above-mentioned two patents, the extraction of the embedded text or image from the complex colour images (For e.g.—CD covers, advertisements etc.), which often use fancy font styles, different languages, uneven text size and different orientation, becomes very difficult.

Therefore, there is felt a need for a document image segmentation system which is adapted to:
- perform the image segmentation on any kind of complex coloured image;
- capture all important regions and groups present in the document image;
- extract text from any complex colour image, wherein the text can be uniform or has uneven text size such as fancy font styles, calligraphic styles or having different orientations;
- extract various image parts present in the image; and
- find the image segments efficiently.

OBJECTS OF THE INVENTION

It is an object of the present invention to provide a document image segmentation system which is capable of performing the image segmentation on any kind of complex coloured image.

It is another object of the present invention to provide a document image segmentation system which is capable of capturing all important regions and groups present in the document image, irrespective of their contents, such as text, graphics or image.

It is still another object of the present invention to provide a document image segmentation system which is capable of recognizing image segments of a complex colour image comprising graphics and text with fancy font styles, calligraphic styles or having different orientations.

It is yet another object of the present invention to provide a document image segmentation system which is capable of image matching.

One more object of the present invention is to provide a document image segmentation system which is capable of finding the image segments efficiently.

It is envisaged that invention provides a document image segmentation system which is capable of identifying one or more company logos, product marks and trademarks from any complex colour image and match them against logos, product marks and trademarks present in a database wherein the logos, product-marks and the trademarks can comprise graphics and text in uniform font style, uneven font styles, calligraphic styles and also in different orientations.

SUMMARY OF THE INVENTION

The present invention envisages a system for document image segmentation for forming different image segments, the system comprising:
- input means adapted to input a document image;
- image pre-processing means adapted to pre-process the document image by maintaining the aspect ratio, the pre-processing means including a colour quantization means to give a pre-processed quantized image;
- colour space transformation means adapted to receive the pre-processed quantized image and apply an Hue, Saturation and Value colour space transformation on the quantized image to derive an transformed image containing only saturation component of the quantized image;
- first image energy calculation means adapted to receive the transformed image and calculate both horizontal and vertical energies of the transformed image to provide a first energy image by cumulating both of the calculated energies of the transformed image;
- grayscale image conversion means adapted to receive the pre-processed quantized image and perform a grayscale conversion operation on the quantized image to provide a gray scale image;
- second image energy calculation means adapted to receive the gray scale image and calculate both horizontal and vertical energies of the gray scale image to provide a second energy image by cumulating both of the calculated energies of the gray scale image;
- computational means adapted to receive first energy image and second energy image to compute a maximum of both the energies and provide a maximum energy image;
- binarization means adapted to receive the maximum energy image and provide a binarized black and white image;
- dilation means adapted to receive the binarized image and perform a dilation operation to provide a dilated image;
- clustering means adapted to receive the dilated image and formulate different clusters based on the density of the dilated areas and provide a clustered image; and
- box creation means adapted to create bounding boxes enclosing each cluster in the clustered image to form an image of documents having image segments.

The system also includes an analyzing unit for analysis of the document image using company logos, product-marks and trademarks, the analyzing unit comprising:
- a database containing images of logos, product-marks and trademarks along with company and product information of a plurality of companies;
- indexing means adapted to index the images of logos, product-marks and trademarks stored in the logo database;
- receiving means adapted to receive different image segments of a document for analysis of the document;
- matching means adapted to match the different image segments with the images of logos, product-marks and trademarks stored in the database to provide matching image segments;
- extraction means adapted to receive the matching image segments and extract the company and product information corresponding to each of the matching image segments; and
- appending means co-operating with the matching means adapted to append non matching image segments containing new logos, product-marks and trademarks, together with information about the company or the product, into the database.

Typically, each pixel of the quantized image is represented by four bits.

Typically, the image pre-processing means also includes a noise removing means.

Typically, the dilation means is adapted to add pixels at boundaries of black pixels thereby providing a thickened and connected image.

Typically, to calculate cumulative energy either root mean square i.e. $(x^2+y^2)^{1/2}$ or geometric mean i.e. $(x*y)^{1/2}$ is used where 'x' and 'y' are pure horizontal and vertical energies or entropies in the neighbourhood of a pixel.

Typically, the clustering means is use DBSCAN technique to compute clusters.

According to another aspect of the invention there is provided a computer-implemented method for document image segmentation, the method comprising following steps:
- inputting a document image;
- pre-processing the document image by maintaining the aspect ratio and performing colour quantization to give a quantized image;
- applying Hue, Saturation and Value colour space transformation on the quantized image;
- deriving a transformed image containing only saturation component of the quantized image;
- calculating both horizontal and vertical energies of the transformed image and cumulating both of the calculated energies;
- providing a first energy image;
- converting a quantized image into a grayscale image;
- calculating both horizontal and vertical energies of the gray scale image and cumulating both of the calculated energies;
- providing a second energy image;
- computing maximum energy of both the energy images;
- providing a maximum energy image;
- binarizing the maximum energy image;
- dilating the binarized image;
- formulating different clusters based on the density of the dilated areas;
- creating bounding boxes enclosing each cluster in the clustered image; and
- forming an image of the document having image segments.

Also, after the step of computing different clusters and forming image segments, document image analysis is done by performing following steps
- providing a database containing images of logos, product-marks and trademarks along with company and product information of a plurality of companies;
- indexing the images of logos, product-marks and trademarks stored in the database;
- receiving different image segments of a document;

matching the different image segments with the indexed images of the logos, product-marks and trademarks stored in the database and providing matching image segments;

extracting the company and product information from the database of matching image segments; and appending non-matching image segments that contain new logos, product-marks or trademarks, together with information about the company or the product, into the database.

Typically, the step of pre-processing also includes a step of noise removing.

Typically, the step of clustering uses DBSCAN technique to compute clusters.

BRIEF DESCRIPTION OF THE ACCOMPANYING DRAWINGS

The invention will now be described in relation to the accompanying drawings, in which.

DETAILED DESCRIPTION OF THE INVENTION

Figure 1:
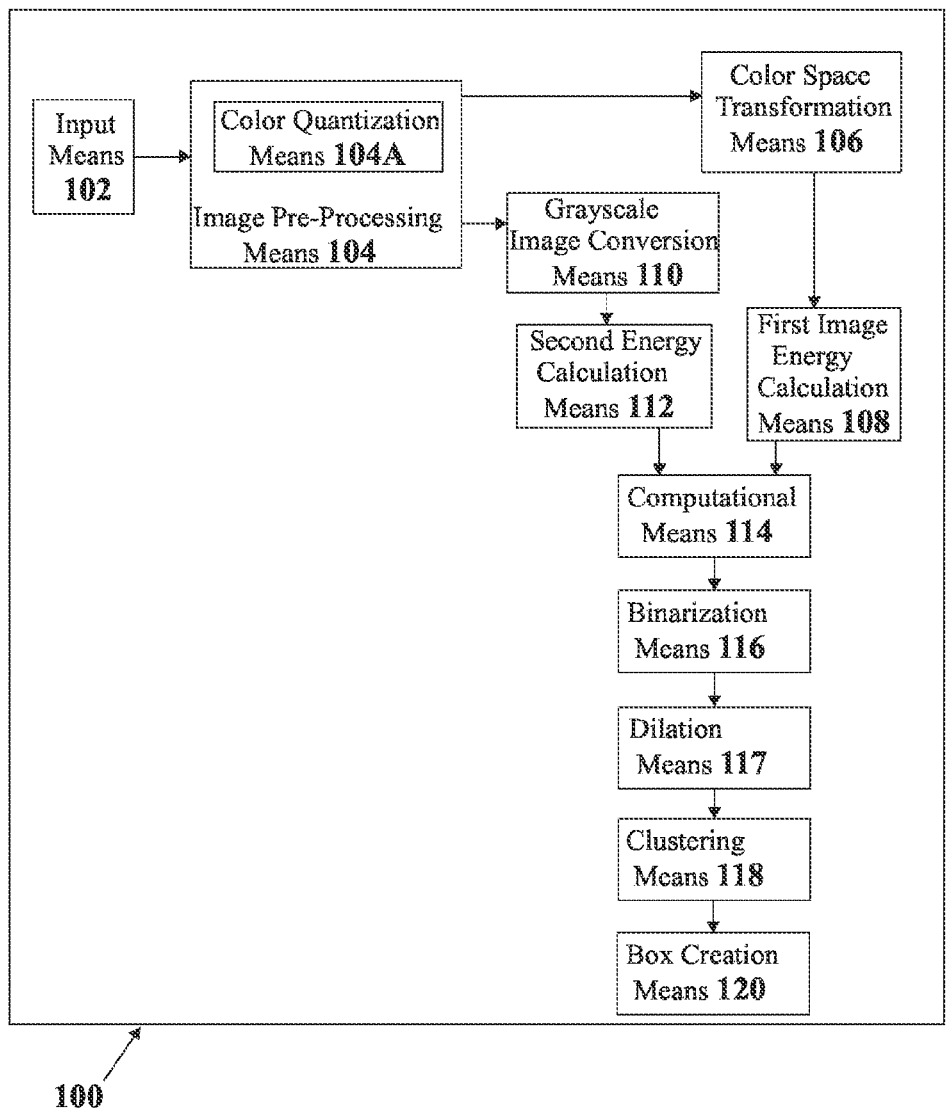
FIG. 1 shows a block diagram of the system for document image segmentation in accordance with the present invention.

The drawing and the description thereto are merely illustrative of a document image segmentation system and only exemplify the invention and in no way limit the scope thereof.

In accordance with the preferred embodiment of the present invention, a document image segmentation system is provided. The images segments are obtained by forming different Clusters in a document image and bounding these clusters by boxes. These clusters are basically groups of objects present in the image which are a bit similar.

FIG. 1 illustrates a system for document image segmentation represented by numeral 100, which takes the document input form the input means 102 and sends it to image pre-processing means 104 adapted to pre-process input image by maintaining the aspect ratio and includes colour quantization means 104 A to perform colour quantization to give a quantized 4-bit image.

Quantization is done to reduce colours in the image while retaining the appearance of the Image.

Now the quantized image is provided to colour space transformation means 106 which performs Hue, Saturation and Value colour space transformation on the quantized image i.e. getting three images out of which first image showing only the Hue component of colours in the image, second image showing only the Saturation component of colours in the image, and the third image showing the Value component of colours in the image. Out of this only the image with saturation component is selected and sent further to a first image energy calculation means 108 which calculates both horizontal and vertical energies of the transformed image and cumulates both of the calculated energies to provide a first energy image.

This quantized image is also given to the grayscale image conversion means 110 which performs a grayscale conversion operation on the quantized image.

The gray scale image is given to a second energy calculation means 112 which calculates both horizontal and vertical energies of the gray scale image and cumulates both of the calculated energies to provide a second energy image.

To calculate cumulative energy we can either use root mean square i.e. $(x^2+y^2)^{1/2}$ or geometric mean i.e. $(x*y)^{1/2}$ where 'x' and 'y' are pure horizontal and vertical energies or entropies.

Further, a maximum of both the first energy image and the second energy image is computed using a computational means 114 which provides a maximum energy image, for instance the maximum energy image can be a maximum of the first energy image and the second energy image and therefore at every point cumulative energy which is higher in the two images is selected.

This maximum energy image is given to binarization means 116 which binarizes the image by first normalizing the energy values in the range of [0, 1] and then applying Otsu's method to provide a binarized (i.e, black and white image). The binarized image is then dilated using 2×2 structuring elements, using dilation means 117 which thickens the black areas of the binarized image by adding pixels to the boundaries of the black pixels and provides a dilated image (thickened and connected image). The dilated image is then sent to the clustering means 118 which formulates different clusters based on the density of the dilated areas using DBSCAN Algorithm. Further, bounding boxes are created using box creation means 120 to enclose each cluster of the clustered image to form an image of documents having image segments.

Figure 2:
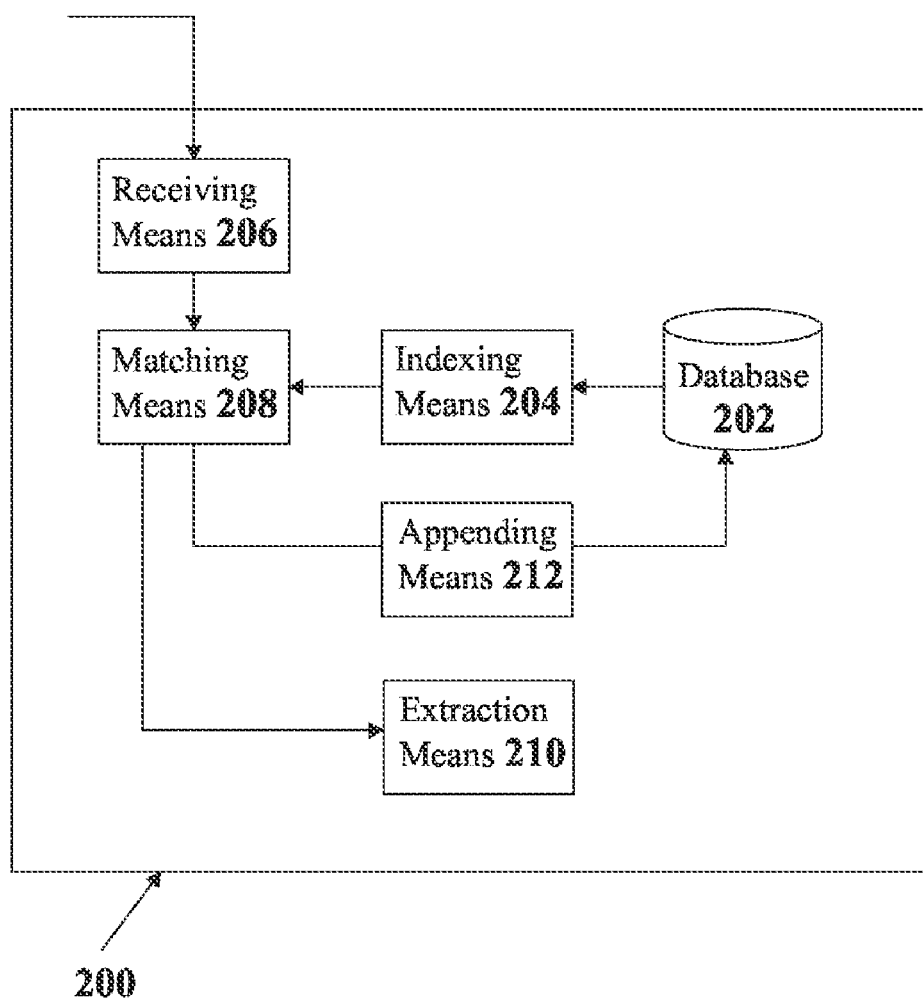
FIG. 2 shows a block diagram of the analyzing unit in accordance with present invention.

In accordance with FIG. 2 another aspect of the present invention is shown according to which the image segments once formed are then sent for further processing so as to enable document image analysis based on logo, product-marks and trademarks i.e. in case of newspaper or magazine advertisements the image segmentation is performed and then image segments are used to analyze the document image according to the company logos, trademarks and product-marks present on the image.

For analyzing the document an analyzing unit 200 is employed which maintains a database 202 containing images of company logos, trademarks and product-marks along with company and product information of various companies, such as company name, company address, product name, product price, product features and such other details, as per the requirements of a specific embodiment of the invention. The images of logos, product-marks and trademarks in the database 202 are indexed using indexing means 204. The image segments of a document image to be matched are received by receiving means 206 and are sent to matching means 208 which matches the different image segments with the logos, product-marks and trademarks stored in the database 202 using PCA-SIFT technique of matching and provides matching image segments to extraction means 210 for extracting the company and product information from the database corresponding to each of the matching image segments. In case there is no match in the database the logo is given to appending means 212 which appends the non matching image segments containing new logo, product-mark or trademark image, ascertained by manual inspection, together with company and product information manually.

Figure 3:
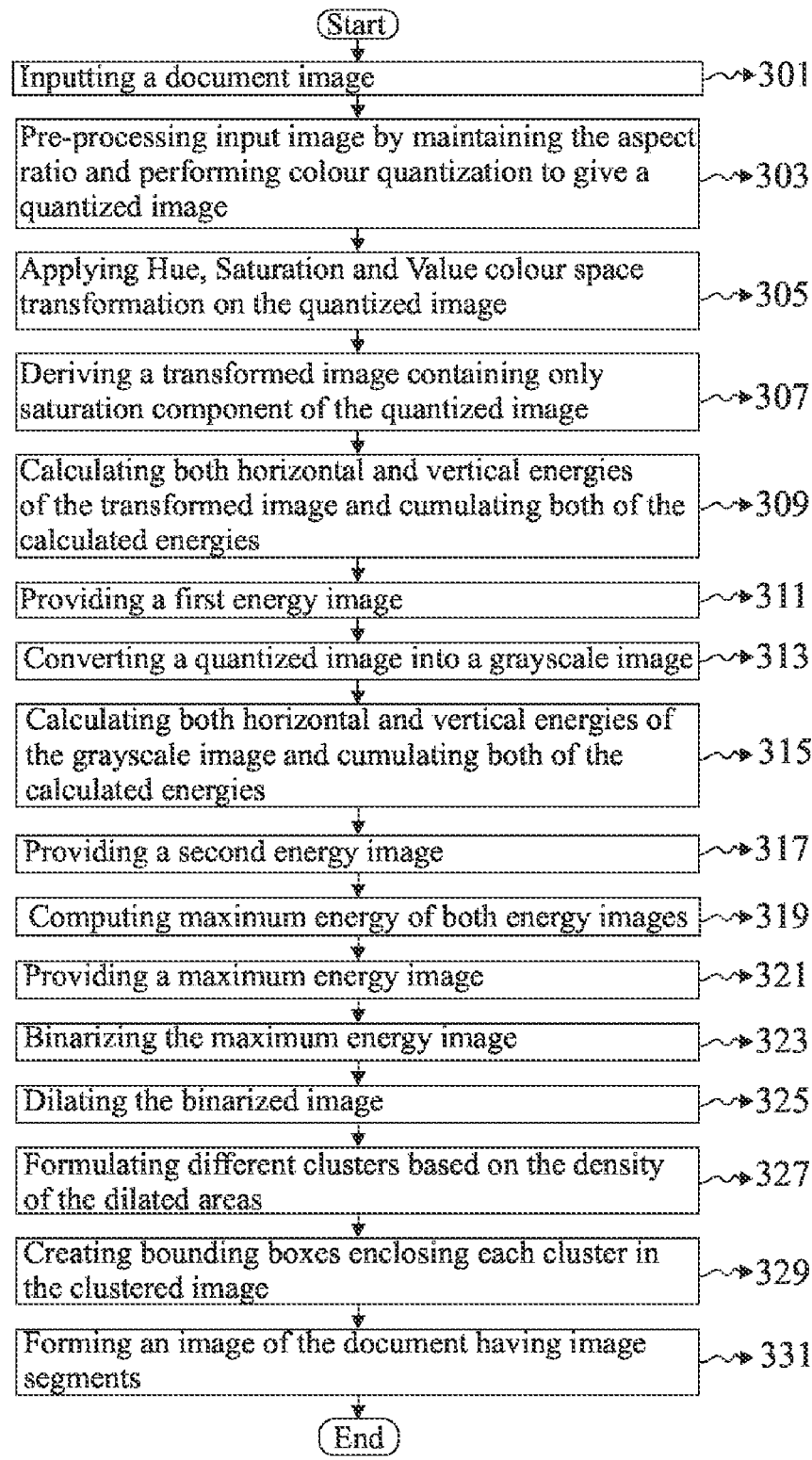
FIG. 3 shows a flowchart of the method for document image segmentation in accordance with the present invention.

Referring to FIG. 3 there is provided a computer-implemented method for document image segmentation, the method comprising following steps:

inputting a document image, 301;

pre-processing input image by maintaining the aspect ratio and performing colour quantization to give a quantized image, 303;
applying Hue, Saturation and Value colour space transformation on the quantized image, 305;
deriving a transformed image containing only saturation component of the quantized image, 307;
calculating both horizontal and vertical energies of the transformed image and cumulating both of the calculated energies, 309;
providing a first energy image, 311;
converting a quantized image into a grayscale image, 313;
calculating both horizontal and vertical energies of the gray scale image and cumulating both of the calculated energies, 315;
providing a second energy image, 317;
computing maximum energy of both the energy images, 319;
providing a maximum energy image, 321;
binarizing the maximum energy image, 323;
dilating the binarized image, 325;
formulating different clusters based on the density of the dilated areas, 327;
creating bounding boxes enclosing each cluster in the clustered image, 329; and
forming an image of the document having image segments, 331.

Figure 4:
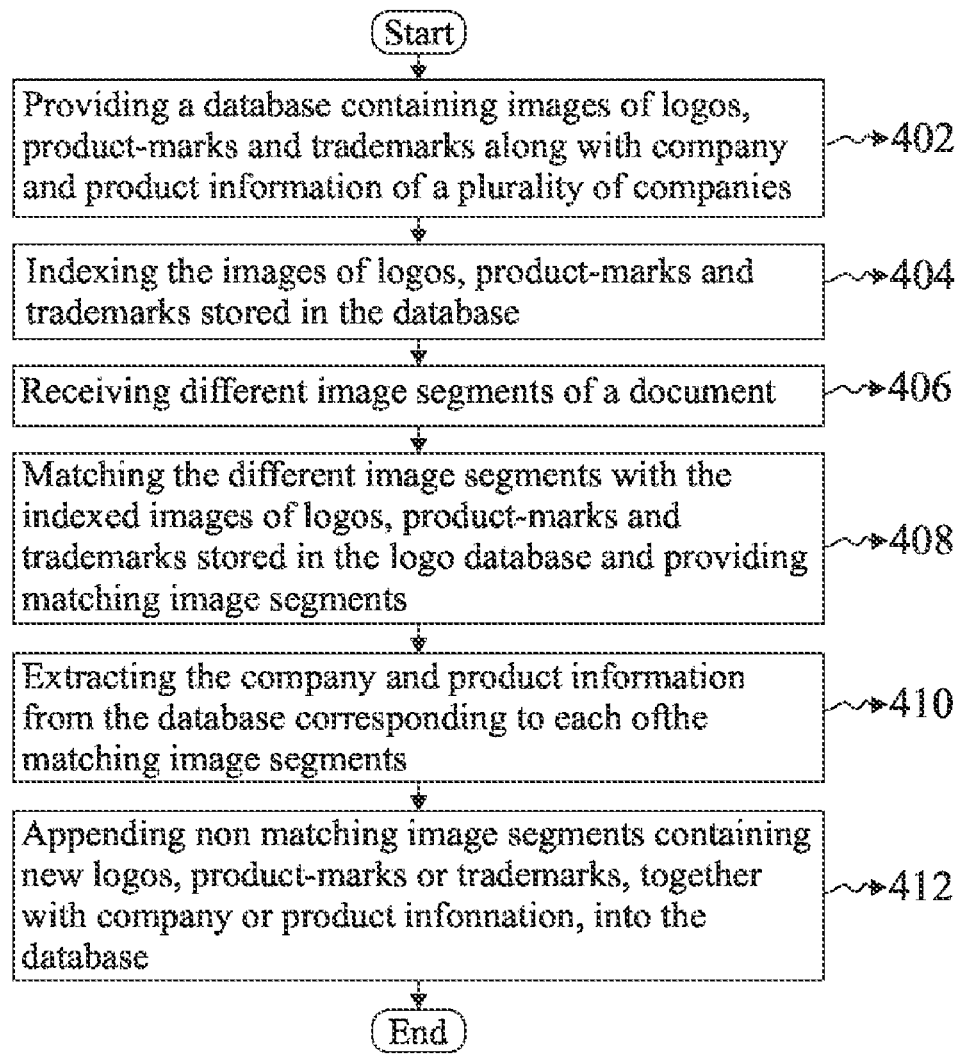
FIG. 4 shows a flowchart of the steps of document image analyzing accordance with the present invention.

Post image segmentation the image segments are used for analysis of the document image which is done using the steps shown in FIG. 4 which are:
providing a database containing images of logos, product-marks and trademarks along with company and product information of a plurality of companies, 402;
indexing the images of logos, product-marks and trademarks stored in the database, 404;
receiving different image segments of a document, 406;
matching the different image segments with the indexed images of logos, product-marks and trademarks stored in the logo database and providing matching image segments, 408;
extracting the company and product information from the database corresponding to each of the matching image segments, 410; and
appending non matching image segments containing new logos, product-marks or trademarks, together with company or product information, into the database, 412.

Technical Advancements

The technical advancements of the present invention is in providing a document image segmentation system which is adapted to:
perform the image segmentation on any kind of complex coloured image;
capture all important regions and groups present in the document image;
identify one or more company logos, product-marks and trademarks present in the document and match them against images of logos, product-marks and trademarks present in a database using image processing technique;
recognize logos, product-marks or trademarks which comprise text or graphics, wherein the text can be uniform or has uneven text size such as fancy font styles, calligraphic styles or having different orientations; and
find the image segments efficiently.

While considerable emphasis has been placed herein on the particular features of this invention, it will be appreciated that various modifications can be made, and that many changes can be made in the preferred embodiments without departing from the principles of the invention. These and other modifications are in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

What is claimed is:

1. A system for document image segmentation, said system comprising:
input means adapted to input a document image;
image pre-processing means adapted to pre-process said document image by maintaining the aspect ratio, said pre-processing means including a colour quantization means to give a pre-processed quantized image;
colour space transformation means adapted to receive said pre-processed quantized image and apply a Hue, Saturation and Value colour space transformation on said quantized image to derive a transformed image containing only saturation component of said quantized image;
first image energy calculation means adapted to receive said transformed image and calculate both horizontal and vertical energies of said transformed image to provide a first energy image by cumulating both of said calculated energies of said transformed image;
grayscale image conversion means adapted to receive said pre-processed quantized image and perform a grayscale conversion operation on said quantized image to provide a gray scale image;
second image energy calculation means adapted to receive said gray scale image and calculate both horizontal and vertical energies of said gray scale image to provide a second energy image by cumulating both of said calculated energies and said gray scale image;
computational means adapted to receive said first energy image and second energy image to compute a maximum of both the energies and provide a maximum energy image;
binarization means adapted to receive said maximum energy image and provide a binarized image;
dilation means adapted to receive said binarized image and perform a dilation operation to provide a dilated image;
clustering means adapted to receive said dilated image and formulate different clusters based on the density of the dilated areas and provide a clustered image; and
box creation means adapted to create bounding boxes enclosing each cluster in the clustered image to form an image of the document having image segments.

2. The system as claimed in claim 1, wherein said system includes an document image analyzing unit, said analyzing unit comprising:
a database containing images of logos, product-marks and trademarks along with company and product information of a plurality of companies;
indexing means adapted to index said images of logos, product-marks and trademarks stored in said database;
receiving means adapted to receive different image segments of a document for analysis of the document;
matching means adapted to match said different image segments with said images of logos, product-marks and trademarks stored in said database to provide matching image segments;
extraction means adapted to receive said matching image segments and extract the company and product information corresponding to each of said matching image segments; and appending means co-operating with said matching means adapted to append non matching image segments containing new logo, product-mark or trademark into the database, together with company or product information.

3. The system as claimed in claim 1, wherein each pixel of said quantized image is represented by four bits.

4. The system as claimed in claim 1, wherein said dilation means is adapted to add pixels at boundaries of black pixels in the binarized image thereby providing a thickened and connected image.

5. The system as claimed in claim 1, wherein said image pre-processing means also includes a noise removing means.

6. The system as claimed in claim 1, wherein said clustering means is adapted to use DBSCAN technique to compute clusters.

7. A computer-implemented method for document image segmentation, said method comprising:
- inputting a document image;
- pre-processing input image by maintaining the aspect ratio and performing colour quantization to give a quantized image;
- applying Hue, Saturation and Value colour space transformation on said quantized image;
- deriving a transformed image containing only saturation component of the quantized image;
- calculating both horizontal and vertical energies of said transformed image and cumulating both of the calculated energies;
- providing a first energy image;
- converting a quantized image into a grayscale image;
- calculating both horizontal and vertical energies of said gray scale image and cumulating both of the calculated energies;
- providing a second energy image;
- computing a maximum of both the energy images;
- providing a maximum energy image;
- binarizing said maximum energy image;
- dilating said binarized image;
- formulating different clusters based on the density of the dilated areas;
- creating bounding boxes enclosing each cluster in the clustered image; and
- forming an image of the document having image segments.

8. The computer-implemented method as claimed in claim 7, further comprising:
- providing a database containing images of logos, product-marks and trademarks along with company and product information of a plurality of companies;
- indexing said images of logos, product-marks and trademarks stored in said database;
- receiving different image segments of a document;
- matching said different image segments with said indexed images of logos, product-marks and trademarks stored in said logo database and providing matching image segments;
- extracting said company and product information from said database corresponding to each of said matching image segments; and
- appending non matching image segments containing new logos, product-marks or trademarks, together with company or product information, into the database.

9. The computer-implemented method as claimed in claim 7, wherein the step of pre-processing includes a step of noise removing.

10. The computer-implemented method as claimed in claim 7, wherein the step of clustering includes a step of using DBSCAN technique to compute clusters.

* * * * *